(12) United States Patent
Garrett et al.

(10) Patent No.: US 8,828,269 B1
(45) Date of Patent: *Sep. 9, 2014

(54) METHOD FOR INCREASING MISCIBILITY OF NATURAL OIL POLYOL WITH PETROLEUM-BASED POLYOL

(76) Inventors: Thomas M. Garrett, Corona, CA (US); Xian Xian Du, Pittsburg, KS (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/927,065

(22) Filed: Nov. 5, 2010

Related U.S. Application Data

(60) Provisional application No. 61/281,316, filed on Nov. 16, 2009.

(51) Int. Cl.
  *C09K 3/00* (2006.01)
  *C11B 3/00* (2006.01)
  *B01F 3/08* (2006.01)

(52) U.S. Cl.
  USPC .......... 252/182.24; 516/20; 554/169

(58) Field of Classification Search
  USPC .......... 516/20; 554/169; 252/182.24
  See application file for complete search history.

(56) References Cited

U.S. PATENT DOCUMENTS

| | | | |
|---|---|---|---|
| 2,882,249 A | | 4/1959 | Posnansky |
| 3,037,947 A | * | 6/1962 | Elkin .......................... 521/128 |
| 3,485,779 A | | 12/1969 | Gast et al. |
| 4,025,477 A | | 5/1977 | Borden et al. |
| 4,094,838 A | | 6/1978 | Schneider et al. |
| 4,174,329 A | | 11/1979 | Bell et al. |
| 4,508,853 A | | 4/1985 | Kluth et al. |
| 4,551,517 A | | 11/1985 | Herold et al. |
| 4,742,087 A | | 5/1988 | Kluth et al. |
| 4,886,893 A | | 12/1989 | Meffert et al. |
| 5,266,714 A | | 11/1993 | Stoll et al. |
| 5,302,626 A | | 4/1994 | Hoefer et al. |
| 5,476,969 A | | 12/1995 | Hinz et al. |
| 6,107,433 A | | 8/2000 | Petrovic et al. |
| 6,121,398 A | | 9/2000 | Wool et al. |
| 6,180,686 B1 | | 1/2001 | Kurth |
| 6,433,121 B1 | | 8/2002 | Petrovic et al. |
| 6,433,125 B1 | | 8/2002 | Gruetzmacher et al. |
| 6,573,354 B1 | | 6/2003 | Petrovic et al. |
| 6,686,435 B1 | | 2/2004 | Petrovic et al. |
| 6,762,274 B2 | | 7/2004 | Waddington et al. |
| 6,891,053 B2 | | 5/2005 | Chasar et al. |
| 6,924,321 B2 | | 8/2005 | Casati et al. |
| 7,674,925 B2 | * | 3/2010 | Garrett et al. .................. 554/26 |
| 2006/0041157 A1 | | 2/2006 | Petrovic et al. |
| 2010/0197878 A1 | * | 8/2010 | Casati et al. .................. 526/319 |
| 2011/0060115 A1 | * | 3/2011 | Garret et al. .................. 528/85 |
| 2011/0086932 A1 | * | 4/2011 | Herrington .................. 521/170 |
| 2011/0086933 A1 | * | 4/2011 | Herrington et al. .......... 521/170 |

FOREIGN PATENT DOCUMENTS

WO   WO 2009/020774 A1 * 2/2009

OTHER PUBLICATIONS de Kraker, J.W. ; Schurink, M.; Franssen, M.C.R. ; Konig, W. A; de Groot, A.; and Bouwmeester, H.J.. " Hydroxylation of Sesquiterpenes by Enzymes From Chicory (*Cichorium intybus* L.) Roots." *Tetrahedron*, 59(2003), pp. 409-418.

Cirino, P.C. and Arnold, F.H.. "Regioselectivity and Activity of Cytochrome P450 BM-3 and Mutant F87A in Reactions Driven by Hydrogen Peroxide." *Advance Synthetics Catalog* 344, No. 9(2002), pp. 932-937.

Groves, J.T. and Viski, P.. "Asymmetric Hydroxylation by a Chiral Iron Porphyrin." *Journal of American Chemistry Society* 111(1989), pp. 8537-8538.

Balandrian, M. F.; Klocke, J.A.; Wurtele, E.S. ; Bollinger, W.H.. "Natural Plant Chemicals: Sources of Industrial and Medicinal Materials." *Science*, 228(1985), pp. 1154-1160.

Findly, T.W.; Swern, D. and Scanlan, J.T.. "Epoxidation of Unsaturated Fatty Materials with Peracetic Acid in Glacial Acetic Acid Solution." *Journal American Chemistry Society*, vol. 67(1945), pp. 412-414.

Gast, L.E., et al. "Polyesteramides from linseed and soybean oils for protective coatings: Diisocyanate-modified polymers." Journal of the American Oil Chemists' Society, vol. 46, No. 7, Jul. 1969. Web Jul. 8, 2009.

* cited by examiner

*Primary Examiner* — Daniel S Metzmaier
(74) *Attorney, Agent, or Firm* — John C. McMahon

(57) ABSTRACT

A method of forming a stable mixture of a natural plant oil polyol and a petroleum-based polyol, including mixing a natural plant oil polyol with a monoglyceride, followed by adding a petroleum based polyol. Stabilized mixtures of plant oil and petroleum-based polyols can be used for synthesis of polyurethanes.

17 Claims, 2 Drawing Sheets

METHOD FOR INCREASING MISCIBILITY OF NATURAL OIL POLYOL WITH PETROLEUM-BASED POLYOL

RELATED APPLICATIONS

This application claims benefit of U.S. Provisional Application No. 61/281,316, filed Nov. 16, 2009, the disclosure of which is hereby expressly incorporated by reference in its entirety and is hereby expressly made a portion of this application.

BACKGROUND OF THE INVENTION

The present invention relates to methods of increasing miscibility between natural oil polyols (NOP) and petroleum-derived polyols (e.g., petroleum-based or pretro polyol) such as aromatic and aliphatic polyester polyol and polyether polyol.

The preparation of polymers from renewable resources is of significant economic and scientific importance. Natural oil polyols, also known as NOPs or biopolyols, are polyols derived from vegetable oils by several different techniques. Vegetable oils have a number of excellent properties that can be utilized in producing valuable polymeric materials, such as but not limited to polyurethanes. Vegetable oils are characterized by their hydroxyl values and fatty acid compositions. NOPs are generally hydrophobic, due to their branching, triglyceride-based structures. Modified soy-based vegetable oil polyols can be used as a replacement for conventional polyols, reacting with isocyanates to produce flexible feedstock polyurethane (PU) foams, elastomers, and coatings. Soybean oil (SBO) is highly hydrophobic, thus excellent weather stability of the soy-based PUs can be expected.

plary NOPs. As with most triglycerides, soy polyols have aliphatic tails joined with a hydrophilic head group.

U.S. patent application Ser. No. 11/524,603, filed Sep. 21, 2006, published as U.S. Publication No. 2008/0076901, now U.S. Pat. No. 7,674,925, which is incorporated herein by reference, describes a method of synthesizing soy-based polyols in one step. FIG. 4 illustrates this method. Namely, the unsaturated sites in soy oil are directly functionalized, without epoxidation, to yield soy polyols in a one-step process. For example, hydrogen groups, such as hydroxyls are efficiently and directly added to the olefin groups of plant oils. Suitable nucleophilic functional groups for synthesis of soy-polyols via this synthetic pathway include, but are not limited to amines, thiols and phosphines. Suitable active hydrogen functional groups include but are not limited to amines, thiols and carboxylic acids. A preferred designed reactant is a polyhydroxylalkyl amine. The reaction is catalyzed by molecules, which upon addition to the plant oil double bonds, yield good leaving groups. Examples of suitable addition catalysts include, but are not limited to: halogens of the structure $X_2$ wherein $X_2$ includes $I_2$, $Br_2$ and $Cl_2$, and hydrohalogens of the structure HX wherein HX includes HI, HBr and HCl. Suitable reaction temperatures for synthesis of soy-polyols via this synthetic pathway are generally between about 120° F. (48° C.) and about 270° F. (132° C.)

According to a method of the invention described in U.S. patent application Ser. No. 11/524,603, natural oil polyols are produced by addition of a designed reactant, N-AH, to olefin groups of a plant oil wherein N includes at least one nucleophilic functional group and AH is a functional group having at least one active hydrogen or masked active hydrogen. The reaction is catalyzed by an addition reaction in which at least one of the functional groups added in the transition state by the catalyst is a good leaving group. A synthetic pathway according to the invention is as follows:

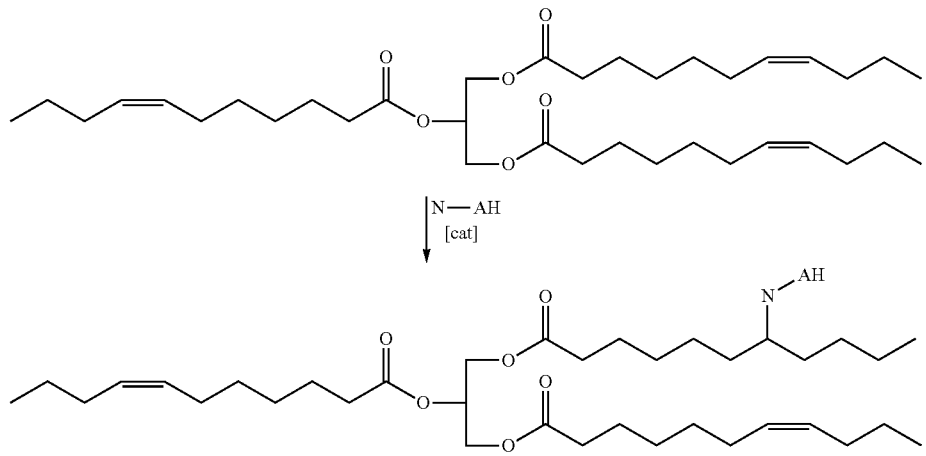

Unfortunately, NOPs also exhibit immiscibility with petroleum-based polyols. While not wishing to be bound by theory, it is believed that this limited miscibility is primarily due to structural differences between NPOs and petroleum-based polyols. FIG. 1 illustrates the chemical structure of two exemplary polyester petroleum-based polyols. FIG. 2 illustrates the chemical structure of four exemplary polyether petroleum-based polyols. These compounds are relatively hydrophilic due to the high number of ester and ether groups available to interact with water molecules due to van der Waals forces. FIG. 3 illustrates the chemical structure of two exem- It is believed that the prevalence of the commercial use of the epoxide synthetic pathway to produce plant polyols is due to a general belief in the art, based upon the findings of numerous authors, that the unsaturated sites in plant polyols cannot be directly, efficiently functionalized to yield polyols. However, as shown above and described herein, a more desirable direct method is possible according to the present invention.

Suitable plant oils for use according to the invention are any plant oil or oil blends containing sites of unsaturation. Such suitable plant oils include, but are not limited to: corn oil, soybean oil, rapeseed oil, sunflower oil, sesame seed oil, peanut oil, safflower oil, olive oil, cotton seed oil, linseed oil, walnut oil and tung oil and mixtures thereof. It is also foreseen that other oils or blends of oils containing sites of unsaturation may be processed according to the invention, including but not limited to natural, genetic, biotic and blends thereof.

Suitable nucleophilic functional groups according to the invention include, but are not limited to amines, thiols and phosphines. Suitable active hydrogen functional groups according to the invention include but are not limited to amines, thiols and carboxylic acids.

A preferred designed reactant according to the invention is a polyhydroxylalkyl amine. For example, according to the invention, the hydroxyl groups of dihydroxyalkylamines that were used to make plant polyols of the invention include primary hydroxyl groups such as diethanolamine, and secondary hydroxyl groups such as bis(2-hydroxypropyl)amine. Preferred alkyl groups of dihydroxyalkylamines used according to the invention are those containing 2 to 12 carbon atoms such as methyl, ethyl, propyl, butyl, pentyl, hexyl, heptyl, octyl, nonyl, decyl, and dodecyl groups. Suitable amines of dihydroxyalkylamines of the invention are secondary amines, primary amines, and diamines such as N,N-bis(2-hydroxyethyl)ethylene diamine and N,N'-bis(2-hydroxyethyl)ethylene diamine.

Processes according to the invention are catalyzed by molecules, which upon addition to the plant oil double bonds, yield good leaving groups. Examples of suitable addition catalysts according to the invention include, but are not limited to: halogens of the structure $X_2$ wherein $X_2$ includes $I_2$, $Br_2$ and $Cl_2$, and hydrohalogens of the structure HX wherein HX includes HI, Hbr and HCl. The halogen $X_2$ functions as a starting catalyst and HX as a finishing catalyst. It is believed that the catalysis proceeds in a manner well known to addition chemistry to form an intermediate. The halogen $X_2$ is added onto the carbon-carbon double bond of plant oil molecules. It is believed that the next step proceeds in a manner well known in $SN_2$ chemistry, replacing the leaving group to form a novel plant polyol. Hydro-halogen HX undergoes addition reaction with a next plant oil molecule or next fatty acid branch of plant oil molecule to give a halogenation product, then the halogenated product undergoes replacement reaction with dihydroxyalkylamine to form the plant polyol and HX. The addition reaction and replacement reaction repeats until the designed reactant, e.g. dihydroxylalkylamine, completely disappears.

It is foreseen that other catalysts may be utilized according to the invention as long as such catalysts perform addition reactions to double bonds and in so doing add a good leaving group. Furthermore, according to the invention, halogen catalysts and hydro-halogen catalysts can be added to cold or hot plant oils. Halogen catalysts may be added to a plant oil in a first step, and once the halogen disappears, a designed reactant, such as a polyhydroxylalkyl amine may be added. Co-addition of the catalyst and the designed reactant is also possible. In a preferred process according to the invention, a hydro-halogen catalyst is added to a plant oil in a first step, followed by the addition of a dihydroxyalkylamine.

Suitable reaction temperatures of processes according to the invention are generally between about 120° F. (48° C.) and about 270° F. (132° C.). Reaction times typically depend on the identity of the catalyst and the reaction temperature. If the reaction is catalyzed by iodine or hydrogen iodide, the reaction is typically faster than reactions catalyzed by other halogen catalysts. The use of greater amounts of a catalyst typically shortens reaction time.

A preferred process according to the invention is the addition of a polyhydroxylalkyl amine molecule onto the olefin groups of a plant oil such as soybean oil. In particular, the designed reactant, a dihydroxlalklamine, contains a primary amine as the nucleophile and two hydroxyl groups as the active hydrogen groups. The reactant adds directly onto the molecule of plant oil in one step, giving a new plant polyol. The following is believed to be a possible mechanism for such a process:

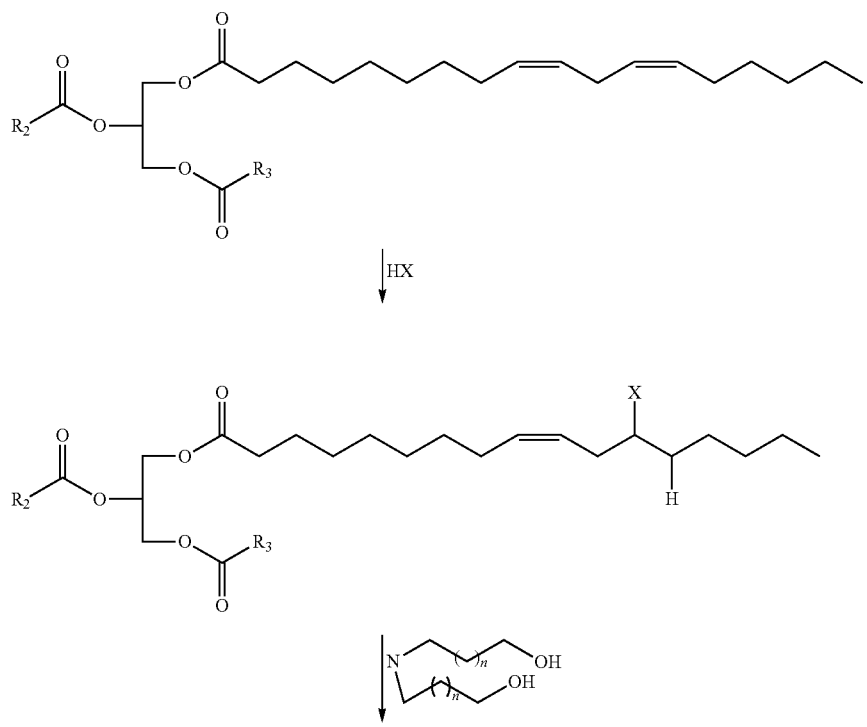

-continued

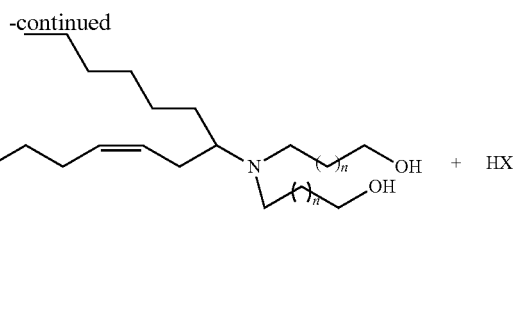

A preferred process according to the invention is catalyzed by iodine. It is believed that an addition reaction occurs, with an iodine atom acting as a leaving group for the incoming nucleophile. It appears that the hydroxyl number of the plant polyol depends on the amount of dihydroxyalkylamine used in the addition reaction. Viscosity of inventive plant polyols of this application typically range between about 250 cps and about 450 cps at room temperature (about 77° F. (25° C.)), which is considered in the art as quite low for a soy polyol. In contrast, commercially known plant polyols typically have a high viscosity, ranging between about 1,200 cps and about 20,000 cps, depending on the hydroxyl number. The high viscosity of known plant polyols can cause mixing difficulties during the formulation of polyurethane.

Furthermore, known plant polyols often have low reactivity due to steric hindrance caused by the presence of secondary alcohols. Such low reactivity yields polyurethanes with poor physical properties. In contrast, plant polyols of the present invention may be designed to contain only primary hydroxyl groups that are known to be quite reactive. Also, in contrast to current epoxide synthetic pathway technology, processes according to the invention result in fewer by-products, as evidenced by the comparatively lower viscosity and lighter color of plant polyols produced according to the invention. In light of these superior properties, good polyurethane foams and elastomers can be made directly from polyols made according to the invention, without using other polyols. Thus, polyols derived from fossil fuels may be completely replaced by plant polyols in the production of polyurethanes, in a cost effective manner, by using the methods and plant polyols according to the invention.

Polyurethanes may be produced by reacting the plant polyols of the invention with a variety of isocyanates, including but not limited to aromatic isocyanates, aliphatic isocyanates, and isocyanate terminated pre-polymers. The physical properties of polyurethane made from the inventive plant polyols depend on the polyols, the formulation and the isocyanate used. Preferred isocyanates include diphenylmethane diisocyanate (MDI) and polymeric diphenylmethane diisocyanate. Other suitable isocyanates include toluene diisocyanate (TDI), methylenebis(cyclohexyl) isocyanate ($H_{12}MDI$), isophorone diisocyanate (IPDI), hexamethylene diisocyanate (HDI), and adducts and pre-polymers of such isocyanates.

It is well known that hydrophobic liquids do not mix well with hydrophilic liquids. However, if the miscibility between NOPs and petroleum-based polyols can be improved, NOPs can serve as renewable resources as feedstocks for chemical processes that will reduce the environmental footprint by reducing the demand on non-renewable fossil fuels currently used in the chemical industry and reduce the overall production of carbon dioxide, the most notable greenhouse gas.

SUMMARY OF THE INVENTION

In one embodiment, a method of stabilizing a mixture of a natural plant oil polyol and a petroleum-based polyol is provided, including the steps of mixing an amount of a monoglyceride with a plant oil polyol; wherein the mixture is simultaneously heated with stirring at a temperature from about 160° F. to about 180° F. or more until the mixture becomes cloudy; and mixing an amount of petroleum-based polyol with the mixture. In some embodiments, the plant oil polyol is derived from soy bean oil.

In a further embodiment, the petroleum-based polyol is selected from the group consisting of polyesters, polyethers, and combinations thereof. In a further embodiment, the petroleum-based polyol is a polyether polyol. In a further embodiment, the petroleum-based polyol is a polyester polyol. In a further embodiment, the petroleum-based polyol is an aliphatic polyester polyol. In a further embodiment, the petroleum-based polyol is an aromatic polyester polyol. In a further embodiment, the petroleum-based polyol is selected from the group consisting of polyether polyol 200 diol, polyether polyol 2000 diol, polyether polyol 300 triol, polyether polyol 3000 triol, polyether polyol 400 diol, polyether polyol 4000 diol, polyether polyol 4800 triol, polyether polyol 700 triol, aliphatic polyester polyol having a $M_r$ of about 1,400 and a hydroxyl value of about 40 (manufactured by Bayer Material Sciences LLC of Pittsburgh, Pa., USA under the trade name RUCOTE® 102), aromatic polyester polyol having a $M_r$ of about 350 and a hydroxyl value of about 315 (manufactured by Stepan Corporation of Northfield, Ill., USA under the trade name STEPANOL® PS-3152), aromatic polyester polyol having a $M_r$ of about 470 and a hydroxyl value of about 240 (manufactured by Stepan Corporation of Northfield, Ill., USA under the trade names STEPANOL® PS-2412 and STEPANOL® PS-2352), and combinations thereof.

In a further embodiment, the monoglyceride is a mixture of monoglycerides.

In a further embodiment, the method further includes the step of cooling the mixture to room temperature.

In a still further embodiment, the cooled mixture is substantially stable for a period of at least 3-hours. In a still further embodiment, the cooled mixture is substantially stable for a period of at least 4-hours. In a still further embodiment, the cooled mixture is substantially stable for a period of at least 2-weeks. In a still further embodiment, the cooled mixture is substantially stable for a period of at least 6-weeks. In a still further embodiment, the cooled mixture is substantially stable for a period of at least 3-months. In a still further embodiment, the cooled mixture is substantially stable for a period of at least 6-months. In a still further embodiment, the cooled mixture is substantially stable for a period of at least 1-year.

In another embodiment, a method of stabilizing a mixture of a natural plant oil polyol and a petroleum-based polyol is provided, including the steps of mixing the plant oil polyol and the petroleum-based polyol to form a mixture; and lowering the free energy of the mixture whereby the mixture does not separate into phases for a period of at least three hours.

OBJECTS AND ADVANTAGES OF THE INVENTION

Therefore, an object of the present invention is to provide compositions and methods that solve one or more of the problems described above. Another object of the invention is to provide compositions and methods that utilize renewable resources, such as agriculturally derived plant oils, for conversion into polyols that can be used as raw materials in the manufacture of polymers, such as polyurethanes. A further object of the invention is to provide methods and compounds for enabling the mixing of plant-based and petro-based polyols for convenient and inexpensive feedstocks in polyurethane synthesis. Furthermore, an object of the invention is to provide methods, reactants and products made therefrom that are inexpensive to produce and especially well adapted for the intended usage thereof. The above noted objects each apply to certain of the embodiments, but not all objects or any may apply to all embodiments of the invention.

Other objects and advantages of the invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
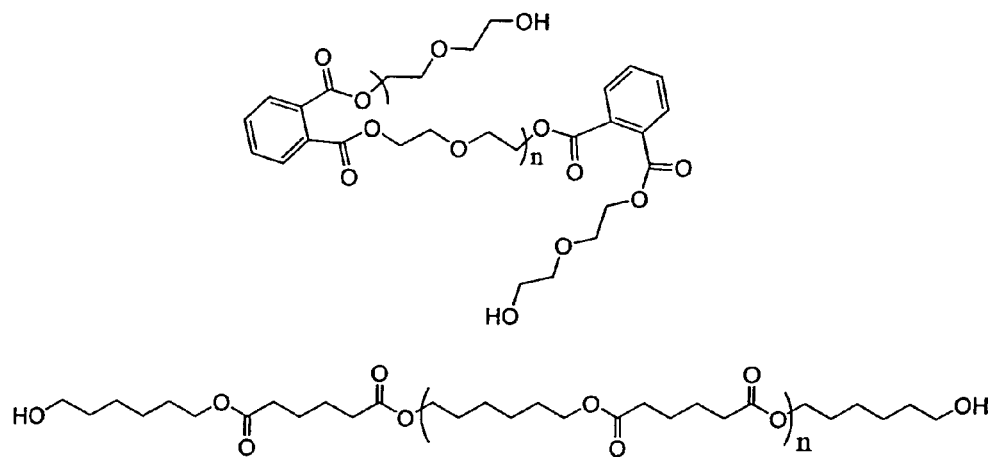
FIG. 1 is schematic illustration of a chemical structure of two exemplary polyester petroleum-based polyols.
Figure 2:
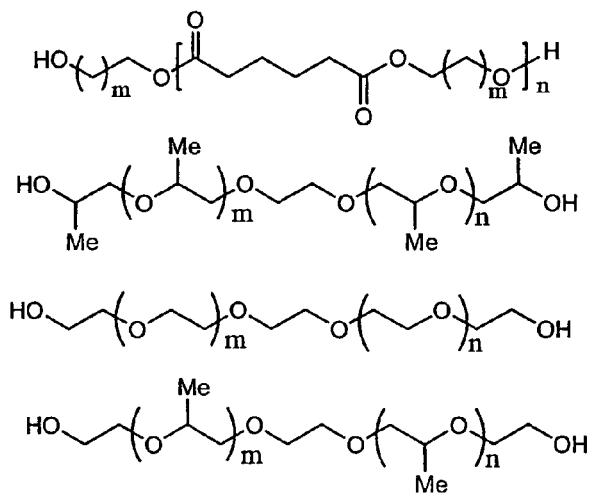
FIG. 2 is schematic illustration of a chemical structure of four exemplary polyether petroleum-based polyols.
Figure 3:
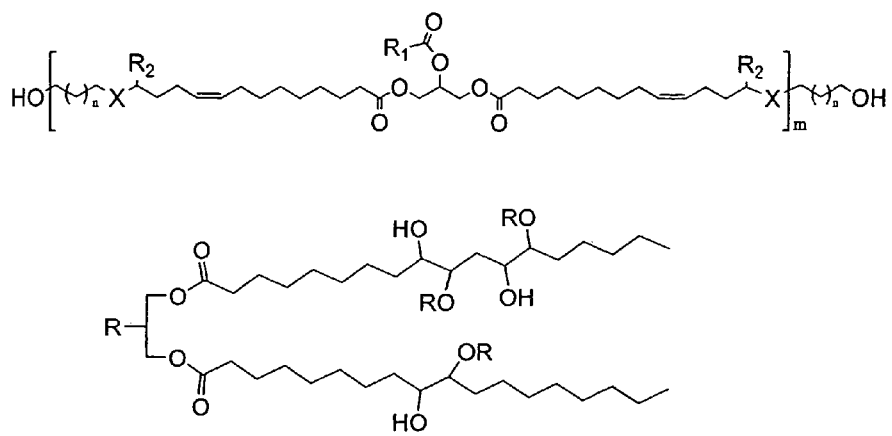
FIG. 3 is schematic illustration of a chemical structure of two exemplary natural oil polyols.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A method of stabilizing a mixture of a natural plant oil polyol and a petroleum-based polyol is provided. According to the methods of the invention, an amount of a monoglyceride is mixed with a plant oil polyol by constant stirring at an elevated temperature ranging from about 160° F. to about 180° F. or more, until the monoglyceride—plant oil polyol mixture has become cloudy. After the monoglyceride—plant oil polyol mixture has become cloudy, an amount of petroleum-based polyol is added with stirring, and then allowed to cool to room temperature.

Suitable plant oil polyols, according to the invention, include but are not limited to corn oil polyol, soybean oil polyol, rapeseed oil polyol, sunflower oil polyol, peanut oil polyol, safflower oil polyol, olive oil polyol, and cotton seed oil polyol. However, soy oil polyol is preferred. Suitable monoglycerides, according to the invention, include single monoglycerides or mixtures of two or more monoglycerides.

Monoglyceride is utilized in the invention. It is believed that almost all monoglycerides would function to increase miscibility in accordance with the invention. Preferred monoglycerides are $C_{18}$. However while $C_{18}$ monoglycerides work well, such tend to be expensive and lower chain monoglycerides such as $C_{14}$ and $C_{16}$ provide a less expensive and reasonably high quality end product. For most uses, monoglycerides having fatty acids in the range from $C_8$ to $C_{12}$ are also quite satisfactory. Tall oil monoglyceride is suitable for many end products and includes a mixture of fatty acids. For example, Tall oil monoglyceride is a molecule resulting from the combination of glycerine with a single fatty acid chain that is mainly one of palmitic or oleic or linoleic acids. Tall oil monoglyceride typically provides a comparatively less expensive alternative to other monoglycerides while providing an acceptable final product.

Suitable petroleum-based polyol, according to the invention, includes but is not limited to polyesters, polyethers, and combinations thereof. In some embodiments, the petroleum-based polyol is a polyether polyol, a polyester polyol, an aliphatic polyester polyol, an aromatic polyester polyol, or combinations thereof.

In preferred embodiments, according to the invention, the cooled mixture of monoglycerides, plant oil polyol and petroleum-based polyol is substantially stable for a period of at least 3-hours. The term "substantially stable" is as used herein is a broad term, and is to be given its ordinary and customary meaning to a person of ordinary skill in the art (and it is not to be limited to a special or customized meaning), and refers without limitation to substantially not separating into two or more liquid phases. In preferred embodiments, the cooled mixture is substantially stable for a period of at least 4-, 6-, 8-, 10-, 12-, 16-, or 24-hours. In more preferred embodiments, the cooled mixture is substantially stable for a period of at least 1-, 2-, 3-, 4-, 5-, 6-, 7-, or 8-weeks. In still more preferred embodiments, the cooled mixture is substantially stable for a period of at least 3-, 4-, 5-, 6-, 7-, 8-, or 9-months. In a most preferred embodiment, the cooled mixture is substantially stable for a period of at least 1-year.

Another method of stabilizing a mixture of a natural plant oil polyol and a petroleum-based polyol is provided, including the steps of mixing the plant oil polyol and the petroleum-based polyol to form a mixture; and lowering the free energy of the mixture whereby the mixture does not separate into phases for a period of at least three hours. While not wishing to be bound by theory, it is believed that the monoglycerides, by interacting with the aliphatic tails of the plant oil polyol, enable attainment of a lower free energy (when the plant oil polyol is mixed with the petroleum-based polyol) than would otherwise be possible.

| EXAMPLE 1: | |
|---|---|
| Component | Amount |
| monoglycerides | 5.0 gm |
| HB230 | 100.0 gm |
| polyether polyol 200 diol | 105.0 gm |

Figure 4:
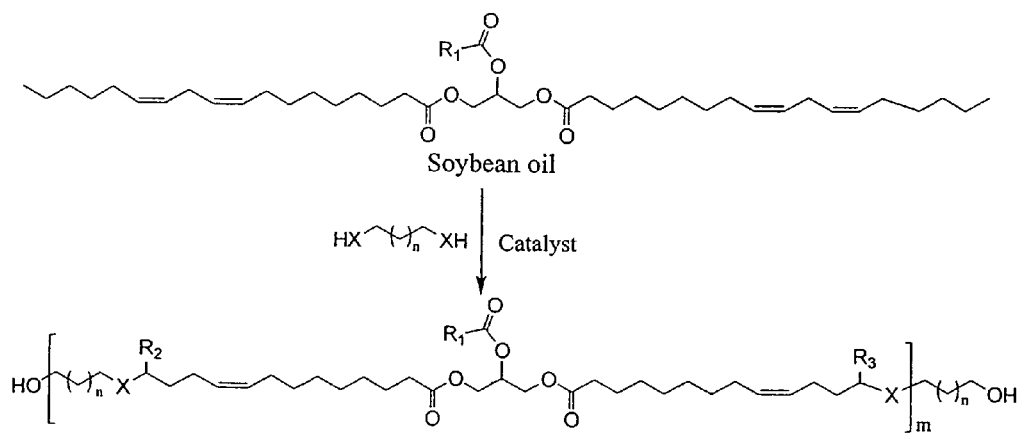
FIG. 4 is a schematic illustration of a synthesis of an exemplary soy oil polyol from soybean oil and diethanolamine in the presence of a catalyst.

The amounts of monoglycerides and the soy-based natural plant oil polyol Honey Bee™ Polyol HB-230 manufactured by MCPU Polymer Engineering, LLC, of Corona, Calif., USA, which has the polyol chemical structure described above with reference to FIG. 4, a hydroxyl number of 220 to 240 mg KOH/gm and a functionality of approximately 2, referred to herein as HB230, indicated in the table above were blended and heated at a temperature between about 160° F. and about 180° F. with stirring. The mixture was stirred until it changed from clear to cloudy. Then, the polyether polyol 200 diol was added to the mixture while stirring, and then cooled to room temperature. The final mixture was maintained at room temperature for 6-months. During the 6-month period, only one phase was observed. The HB230 and polyether polyol 200 diol were not observed to separate into two phases.

| EXAMPLE 2: | |
|---|---|
| Component | Amount |
| monoglycerides | 5.0 gm |
| HB230 | 100.0 gm |
| polyether polyol 3000 triol | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 3000 triol was added to the mixture while stirring, and then cooled to room temperature. The final mixture was maintained at room temperature for 6-months. During the 6-month period, only one phase was observed. The HB230 and polyether polyol 3000 triol were not observed to separate into two phases.

| EXAMPLE 3: | |
|---|---|
| Component | Amount |
| monoglycerides | 5.0 gm |
| HB230 | 100.0 gm |
| polyether polyol 4000 diol | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 4000 diol was added to the mixture while stirring, and then cooled to room temperature. The final mixture was maintained at room temperature for 6-months. During the 6-month period, only one phase was observed. The HB230 and polyether polyol 4000 diol were not observed to separate into two phases.

| EXAMPLE 4: | |
|---|---|
| Component | Amount |
| monoglycerides | 5.0 gm |
| HB230 | 100.0 gm |
| polyether polyol 4800 triol | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 4800 triol was added to the mixture while stirring, and then cooled to room temperature. The final mixture was maintained at room temperature for 6-months. During the 6-month period, only one phase was observed. The HB230 and polyether polyol 4800 triol were not observed to separate into two phases.

| EXAMPLE 5: | |
|---|---|
| Component | Amount |
| monoglycerides | 5.0 gm |
| HB230 | 100.0 gm |
| polyether polyol 400 diol | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 400 diol was added to the mixture while stirring, and then cooled to room temperature. The final mixture was maintained at room temperature for 6-months. During the 6-month period, only one phase was observed. The HB230 and polyether polyol 400 diol were not observed to separate into two phases.

| EXAMPLE 6: | |
|---|---|
| Component | Amount |
| monoglycerides | 5.0 gm |
| HB230 | 100.0 gm |
| polyether polyol 700 triol | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 700 triol was added to the mixture while stirring, and then cooled to room temperature. The final mixture was maintained at room temperature for 6-months. During the 6-month period, only one phase was observed. The HB230 and polyether polyol 700 triol were not observed to separate into two phases.

| EXAMPLE 7: | |
|---|---|
| Component | Amount |
| monoglycerides | 2.0 gm |
| HB230 | 100.0 gm |
| polyether polyol 2000 diol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 2000 diol was added to the mixture while stirring, and then cooled to room temperature. The final mixture was maintained at room temperature for 3-months. During the 3-month period, only one phase was observed. The HB230 and polyether polyol 2000 diol were not observed to separate into two phases.

EXAMPLE 8:

| Component | Amount |
|---|---|
| monoglycerides | 2.0 gm |
| HB230 | 100.0 gm |
| polyether polyol 3000 triol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 3000 triol was added to the mixture while stirring, and then cooled to room temperature. The final mixture was maintained at room temperature for 3-months. During the 3-month period, only one phase was observed. The HB230 and polyether polyol 3000 triol were not observed to separate into two phases.

EXAMPLE 9:

| Component | Amount |
|---|---|
| monoglycerides | 2.0 gm |
| HB230 | 100.0 gm |
| polyether polyol 4000 diol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 4000 diol was added to the mixture while stirring, and then cooled to room temperature. The final mixture was maintained at room temperature for 3-months. During the 3-month period, only one phase was observed. The HB230 and polyether polyol 4000 diol were not observed to separate into two phases.

EXAMPLE 10:

| Component | Amount |
|---|---|
| monoglycerides | 2.0 gm |
| HB230 | 100.0 gm |
| polyether polyol 4800 triol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 4800 triol was added to the mixture while stirring, and then cooled to room temperature. The final mixture was maintained at room temperature for 3-months. During the 3-month period, only one phase was observed. The HB230 and polyether polyol 4800 triol were not observed to separate into two phases.

EXAMPLE 11:

| Component | Amount |
|---|---|
| monoglycerides | 2.0 gm |
| HB230 | 100.0 gm |
| polyether polyol 400 diol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 400 diol was added to the mixture while stirring, and then cooled to room temperature. The final mixture was maintained at room temperature for 3-months. During the 3-month period, only one phase was observed. The HB230 and polyether polyol 400 diol were not observed to separate into two phases.

EXAMPLE 12:

| Component | Amount |
|---|---|
| monoglycerides | 2.0 gm |
| HB230 | 100.0 gm |
| polyether polyol 700 triol | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyether polyol 700 triol was added to the mixture while stirring, and then cooled to room temperature. The final mixture was maintained at room temperature for 3-months. During the 3-month period, only one phase was observed. The HB230 and polyether polyol 700 triol were not observed to separate into two phases.

EXAMPLE 13:

| Component | Amount |
|---|---|
| monoglycerides | 5.0 gm |
| HB230 | 100.0 gm |
| aliphatic polyester polyol Rucote 102 (Bayer) | 50.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Rucote 102 was added to the mixture while stirring, and then cooled to room temperature. The final mixture was maintained at room temperature for 6-months. During the 6-month period, only one phase was observed. The HB230 and polyester polyol Rucote 102 were not observed to separate into two phases.

EXAMPLE 14:

| Component | Amount |
|---|---|
| monoglycerides | 2.0 gm |
| HB230 | 100.0 gm |

EXAMPLE 14:

| Component | Amount |
|---|---|
| aromatic polyester polyol Stepanol PS-3152 | 102.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-3152 was added to the mixture while stirring, and then cooled to room temperature. The final mixture was maintained at room temperature for 2-weeks. During the 2-week period, only one phase was observed. The HB230 and polyester polyol Stepanol PS-3152 were not observed to separate into two phases.

EXAMPLE 15:

| Component | Amount |
|---|---|
| monoglycerides | 2.0 gm |
| HB230 | 100.0 gm |
| aromatic polyester polyol Stepanol PS-2412 | 102.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2412 was added to the mixture while stirring, and then cooled to room temperature. The final mixture was maintained at room temperature for 2-weeks. During the 2-week period, only one phase was observed. The HB230 and polyester polyol Stepanol PS-2412 were not observed to separate into two phases.

EXAMPLE 16:

| Component | Amount |
|---|---|
| monoglycerides | 2.0 gm |
| HB230 | 100.0 gm |
| aromatic polyester polyol Stepanol PS-2352 | 102.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2352 was added to the mixture while stirring, and then cooled to room temperature. The final mixture was maintained at room temperature for 2-weeks. During the 2-week period, only one phase was observed. The HB230 and polyester polyol Stepanol PS-2352 were not observed to separate into two phases.

EXAMPLE 17:

| Component | Amount |
|---|---|
| monoglycerides | 3.5 gm |
| HB230 | 100.0 gm |
| aromatic polyester polyol Stepanol PS-3152 | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-3152 was added to the mixture while stirring, and then cooled to room temperature. The final mixture was maintained at room temperature for 6-weeks. During the 6-week period, only one phase was observed. The HB230 and polyester polyol Stepanol PS-3152 were not observed to separate into two phases.

EXAMPLE 18:

| Component | Amount |
|---|---|
| monoglycerides | 3.5 gm |
| HB230 | 100.0 gm |
| aromatic polyester polyol Stepanol PS-2412 | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2412 was added to the mixture while stirring, and then cooled to room temperature. The final mixture was maintained at room temperature for 6-weeks. During the 6-week period, only one phase was observed. The HB230 and polyester polyol Stepanol PS-2412 were not observed to separate into two phases.

EXAMPLE 19:

| Component | Amount |
|---|---|
| monoglycerides | 3.5 gm |
| HB230 | 100.0 gm |
| aromatic polyester polyol Stepanol PS-2352 | 100.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2352 was added to the mixture while stirring, and then cooled to room temperature. The final mixture was maintained at room temperature for 6-weeks. During the 6-week period, only one phase was observed. The HB230 and polyester polyol Stepanol PS-2352 were not observed to separate into two phases.

EXAMPLE 20:

| Component | Amount |
| --- | --- |
| monoglycerides | 5.0 gm |
| HB230 | 100.0 gm |
| aromatic polyester polyol Stepanol PS-3152 | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-3152 was added to the mixture while stirring, and then cooled to room temperature. The final mixture was maintained at room temperature for 3-months. During the 3-month period, only one phase was observed. The HB230 and polyester polyol Stepanol PS-3152 were not observed to separate into two phases.

EXAMPLE 21:

| Component | Amount |
| --- | --- |
| monoglycerides | 5.0 gm |
| HB230 | 100.0 gm |
| aromatic polyester polyol Stepanol PS-2412 | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2412 was added to the mixture while stirring, and then cooled to room temperature. The final mixture was maintained at room temperature for 3-months. During the 3-month period, only one phase was observed. The HB230 and polyester polyol Stepanol PS-2412 were not observed to separate into two phases.

EXAMPLE 22:

| Component | Amount |
| --- | --- |
| monoglycerides | 5.0 gm |
| HB230 | 100.0 gm |
| aromatic polyester polyol Stepanol PS-2352 | 105.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2352 was added to the mixture while stirring, and then cooled to room temperature. The final mixture was maintained at room temperature for 3-months. During the 3-month period, only one phase was observed. The HB230 and polyester polyol Stepanol PS-2352 were not observed to separate into two phases.

EXAMPLE 23:

| Component | Amount |
| --- | --- |
| monoglycerides | 10.0 gm |
| HB230 | 100.0 gm |
| aromatic polyester polyol Stepanol PS-3152 | 110.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-3152 was added to the mixture while stirring, and then cooled to room temperature. The final mixture was maintained at room temperature for >1-year. During the >1-year period, only one phase was observed. The HB230 and polyester polyol Stepanol PS-3152 were not observed to separate into two phases.

EXAMPLE 24:

| Component | Amount |
| --- | --- |
| monoglycerides | 10.0 gm |
| HB230 | 100.0 gm |
| aromatic polyester polyol Stepanol PS-2412 | 110.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2412 was added to the mixture while stirring, and then cooled to room temperature. The final mixture was maintained at room temperature for >1-year. During the >1-year period, only one phase was observed. The HB230 and polyester polyol Stepanol PS-2412 were not observed to separate into two phases.

EXAMPLE 25:

| Component | Amount |
| --- | --- |
| monoglycerides | 10.0 gm |
| H9230 | 100.0 gm |
| aromatic polyester polyol Stepanol PS-2352 | 110.0 gm |

The amounts of monoglycerides and the soy-based natural plant oil polyol HB230 indicated in the table above were blended and heated at a temperature between about 160° F. and about 180° F. with stirring. The mixture was stirred until it changed from clear to cloudy. Then, the polyester polyol Stepanol PS-2352 was added to the mixture while stirring, and then cooled to room temperature. The final mixture was maintained at room temperature for >1-year. During the >1-year period, only one phase was observed. The HB230 and polyester polyol Stepanol PS-2352 were not observed to separate into two phases.

It is to be understood that while certain forms of the present invention have been illustrated and described herein, it is not to be limited to the specific forms or arrangement of parts described and shown.

What is claimed and desired to be secured by Letters Patent is as follows:

1. A method of stabilizing a mixture of a natural plant oil polyol and a petroleum-based polyol, comprising the steps of:
   a) mixing an amount of a monoglyceride with an amount of a natural plant oil polyol having a polymer chain with a hydroxyl group at opposite ends of the polymer chain so as to form a first mixture, wherein the natural plant oil polyol is formed from a natural plant oil;
   b) simultaneously stirring and heating the first mixture at a temperature from about 160° F. to about 180° F. until the first mixture becomes clear; and
   c) mixing an amount of a petroleum-based polyol with the clear first mixture of step b) so as to form a second mixture of the natural plant oil polyol and a petroleum-based polyol; wherein
   d) the second mixture is substantially stable for a period of time.

2. The method of claim 1, wherein the plant oil polyol is derived from soy bean oil.

3. The method of claim 1, wherein the petroleum-based polyol is selected from the group consisting of polyesters, polyethers, and combinations thereof.

4. The method of claim 1, wherein the petroleum-based polyol is a polyether polyol.

5. The method of claim 1, wherein the petroleum-based polyol is a polyester polyol.

6. The method of claim 1, wherein the petroleum-based polyol is an aliphatic polyester polyol.

7. The method of claim 1, wherein the petroleum-based polyol is an aromatic polyester polyol.

8. The method of claim 1, wherein the petroleum-based polyol is selected from the group consisting of polyether polyol 200 diol, polyether polyol 2000 diol, polyether polyol 300 triol, polyether polyol 3000 triol, polyether polyol 400 diol, polyether polyol 4000 diol, polyether polyol 4800 triol, polyether polyol 700 triol, aliphatic polyester polyols having a molecular weight of about 1,400 and a hydroxyl value of about 40, aromatic polyester polyol having a molecular weight of about 350 and a hydroxyl value of about 315, aromatic polyester polyols having a molecular weight of about 470 and a hydroxyl value of about 240, and combinations thereof.

9. The method of claim 1, further comprising cooling the second mixture from step c) to room temperature.

10. The method of claim 9, wherein the cooled second mixture is substantially stable for a period of at least 3-hours.

11. The method of claim 9, wherein the cooled second mixture is substantially stable for a period of at least 4-hours.

12. The method of claim 9, wherein the cooled second mixture is substantially stable for a period of at least 2-weeks.

13. The method of claim 9, wherein the cooled second mixture is substantially stable for a period of at least 6-weeks.

14. The method of claim 9, wherein the cooled second mixture is substantially stable for a period of at least 3-months.

15. The method of claim 9, wherein the cooled second mixture is substantially stable for a period of at least 1-year.

16. The method of claim 9, wherein the cooled second mixture is substantially stable for a period of at least 6-months.

17. A method of stabilizing a mixture of a natural plant oil polyol and a petroleum-based polyol, comprising:
   a) mixing the natural plant oil polyol, wherein the natural plant oil polyol is synthesized by reacting a plant oil with a reactant having at least one nucleophilic function group and at least one active hydrogen function group in the presence of an addition reaction catalyst in a single reaction step, and the petroleum-based polyol to form a mixture; and
   b) lowering the free energy of the mixture whereby the mixture does not separate into phases for a period of at least three hours; wherein
   c) lowering the free energy of the mixture includes stirring a monoglyceride with the mixture.

* * * * *